United States Patent [19]

Jung

[11] 4,171,161
[45] Oct. 16, 1979

[54] TESTING OPAQUE WORKPIECES, PARTICULARLY TINY OR THIN ELONGATED OBJECTS SUCH AS PINS, BOLTS, WIRES, OR THE LIKE, FOR ORIENTATION, SIZE AND MATERIAL INTEGRITY

[75] Inventor: Rainer Jüng, Weinstadt, Fed. Rep. of Germany

[73] Assignee: Robert Bosch GmbH, Stuttgart, Fed. Rep. of Germany

[21] Appl. No.: 782,420

[22] Filed: Mar. 29, 1977

[30] Foreign Application Priority Data

May 7, 1976 [DE] Fed. Rep. of Germany ....... 2620240

[51] Int. Cl.² ............................................. G01B 11/00
[52] U.S. Cl. ................................... 356/383; 356/237; 356/372
[58] Field of Search ............... 356/156, 167, 168, 237, 356/102, 159, 372, 383, 385, 71, 23; 250/222 R, 223 R

[56] References Cited

U.S. PATENT DOCUMENTS

| 3,604,940 | 9/1971 | Matthews | 356/159 |
| 3,830,572 | 8/1974 | Lueck | 356/156 |
| 3,900,738 | 8/1975 | McKay | 356/156 |
| 3,901,606 | 8/1975 | Watanabe et al. | 356/159 |
| 3,922,094 | 11/1975 | Colding | 356/167 |
| 3,989,386 | 11/1976 | Smith | 356/167 |
| 3,992,107 | 11/1976 | Loy | 356/167 |

FOREIGN PATENT DOCUMENTS 1379473 1/1975 United Kingdom ..................... 356/167

Primary Examiner—John K. Corbin
Assistant Examiner—R. A. Rosenberger
Attorney, Agent, or Firm—Frishauf, Holtz, Goodman & Woodward

[57] ABSTRACT

A light source, preferably an electrical flash tube, generates a beam of light which, preferably, is collimated to provide a parallel beam output. The workpieces are placed in the beam of light to generate a shadow image. The shadow image and surrounding beam portions are projected on a screen, with intervening optical enlargement, on which photoelectric sensors are located positioned in the projected shadow image and preferably also in adjacent regions of the light beam, the outputs from the sensors being compared with each other, or with a reference, to determine relative shadow image characteristics of regions of the objects in the light beam path, the output signals being a measure of differences in characteristics, and hence determinative of orientation, size, or integrity of the workpiece material. To test for size or orientation, two sensors are located at the end portions of the shadow images of pins, or bolts, carried through a test path interposed between the parallel beams from the light source, before enlargement.

14 Claims, 11 Drawing Figures

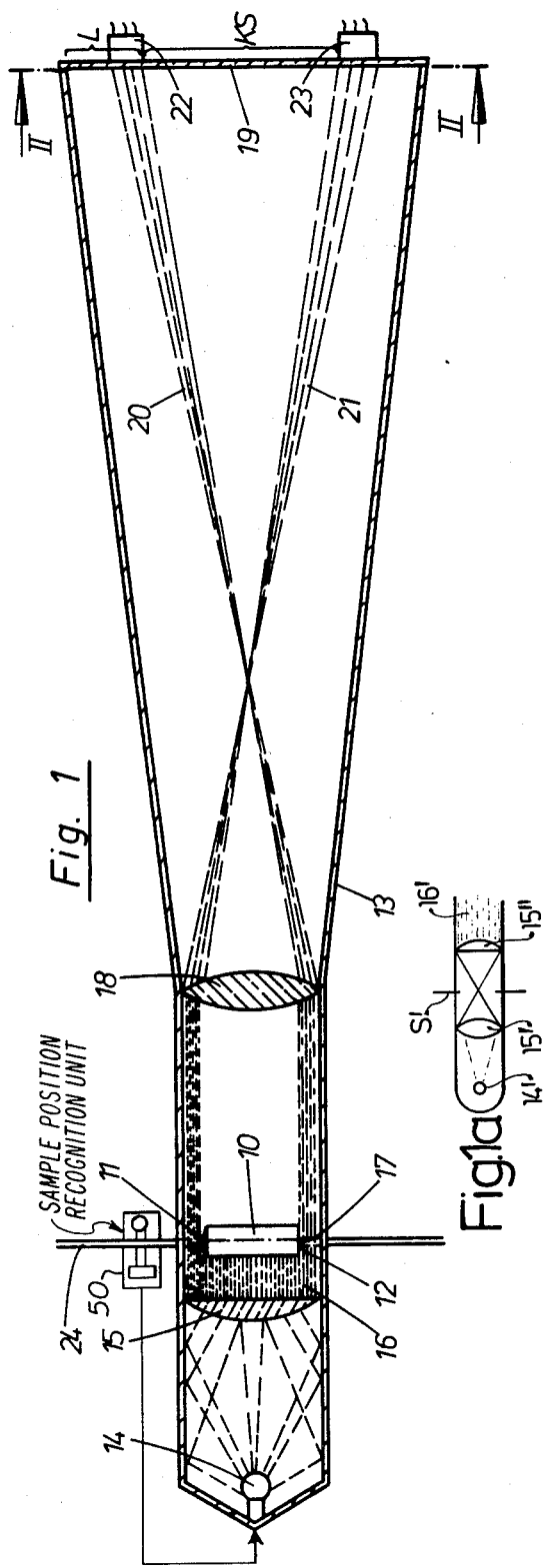
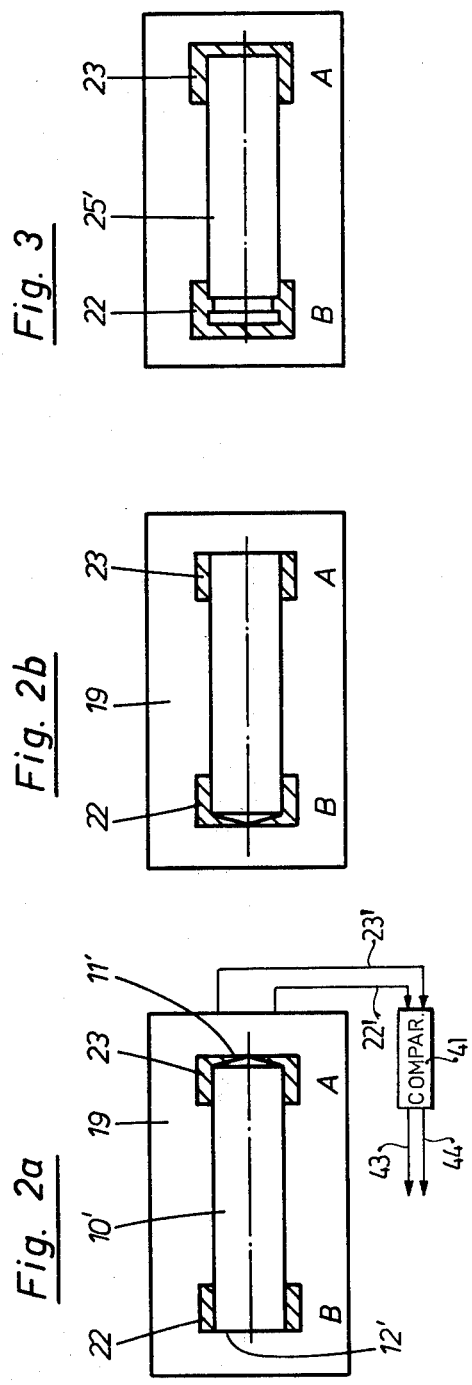

TESTING OPAQUE WORKPIECES, PARTICULARLY TINY OR THIN ELONGATED OBJECTS SUCH AS PINS, BOLTS, WIRES, OR THE LIKE, FOR ORIENTATION, SIZE AND MATERIAL INTEGRITY

The present invention relates to testing and checking of workpieces which are of opaque material for size, shape or outline, position with respect to a reference, fissures in the material, and the like.

It is frequently required to check the position of workpieces which are transported in a transport path with respect to orientation. Thus, for example, bolts, screws, and other elongated elements are frequently required to be oriented so that their heads are, uniformly, at leading or trailing positions for subsequent use in automatic machinery. The orientation of the elements must be sensed and elements which are improperly oriented may, for example, be ejected from the transport path for re-introduction in proper orientation, reversal, or the like. Testing of the workpieces for orientation should be rapid and should be possible without interrupting continuous movement of the transport path. An additional requirement is often placed on such apparatus which permits the testing or checking of the orientation of miniature elements based on minute distinctions in size, shape or outline of the elements at their respective ends. The checking or testing step should be capable of being carried out, preferably, without contacting the elements in order to prevent wear on the elements as well as on the testing or checking apparatus.

Tiny bolts, pins, and the like are difficult to check with mechanical measuring and testing apparatus and methods both with respect to basic dimensions, such as length and diameter, as well as with respect to orientation. The problem also arises in testing of essentially endless materials, such as thin wires, filaments, yarns, and the like, with respect to irregularities of cross-sectional diameter, variations beyond tolerances with respect to thickened, or excessively thin portions; such materials are difficult to check and test when in motion.

It is an object of the present invention to permit testing or checking of opaque materials with respect to alignment and orientation, size, outline, or the like, and further with respect to certain defects in the materials, which is rapid, accurate, and permits checking of even tiny articles, without contacting the articles and while they are moving rapidly through a transport path. The method and system should also be capable of being used with transport paths or machinery without essential modification thereof. The test steps should permit checking of workpieces with respect to orientation which is reliable and provided unambiguous output signals even if the differences in characteristics of respective ends of the test pieces are only small.

SUBJECT MATTER OF THE PRESENT INVENTION

Briefly, the workpieces are placed in the path of a beam of light, preferably a beam having parallel rays. The beam is then projected on a screen which, thereby, projects a shadow of the outline of the workpiece on the screen. The screen is fully illuminated where impinged by the beam, and will have a black or shadow portion where the light is blocked by the test workpiece. The light intensity projected on at least portions of the screen is then sensed and compared with a command or reference value relating to the light which should be received at the respective portion if the article to be tested is of proper size, shape and orientation. Any deviation between commanded signal and actually received signal will result in an error signal which forms the test or output signal.

As an example, the system and method of the present invention permit testing tiny headed pins for orientation; such pins may have a pin or rod diameter of 5 mm, a head diameter of 6 mm, and a length of 25 mm. These tiny elements are difficult to handle and test.

The present invention is based on the realization that beamed light will continue in a straight line path and that, hence, shadows will likewise be formed as a direct representation of the light which was blocked by an opaque object in the beam. The beam of light, with the shadow portion taken out, can be enlarged. A point-formed light source provides a relatively sharp completely black shadow of the outline of an opaque body in the beam of light, the circumference of the body, which is not formed as a shadow yielding, however, full illumination. The shadow image is enlarged with respect to the size of the body itself. The degree of enlargement increases with the distance of the observation plane from the body. If the body is represented by a test object, then even extremely small test objects can provide an enlarged shadow image. The shape and size of the test object thus appears greatly enlarged on an observation screen or plane, so that even very small differences or orientation characteristics can be decoded and recognized. Thus, sorting for orientation and positional alignment can be carried out already with small test objects directly on the transport path. Deviations from size and shape can also be checked; likewise, transverse fissures, blow holes, or other openings in the material of the body can be checked due to their enlarged appearance within the shadow image of the test object.

To obtain an output signal, a screen is used on which portions are selected to measure the quantity of light impinging thereon. The portion of the screen is so arranged that it encompasses a portion of the shadow of the opaque object as well as a portion of the completely illuminated surrounding. The measured result is then compared with a predetermined command value which can be obtained by introducing a standard element of known, proper orientation, size, and material into the path of the beam to obtain a standard comparison or reference output value. If the command value and the value sensed when a test object is introduced in the beam are the same, then the test object is of proper size and orientation and can continue on its transport or conveying path; if this is not the case, however, then the test object can be deviated or ejected from the transport path, either because it is in improper position thereon—if testing is for orientation, or is of improper size or shape—if testing is for tolerance and shape, or if light is detected within the area where the core shadow ought to be—if testing is to be directed with respect to defects of the material itself.

Testing for orientation in a path requires measuring only a portion of the light falling on the screen in which characteristic shapes or dimensions of the test object will appear in their shadow image. For example, small-headed or flat cylindrical bolts which are plane at one end and conical at the other can be checked for orientation since the conical outline will appear on a projection screen as a tapered, triangular shadow with a fully illuminated outer circumference. Testing a portion of the field of the screen for light thereon then provides a certain measurable output of the completely illuminating surrounding. If this measurable output is smaller than a predetermined reference value, for example if the headed end is in the position where the conical end ought to be, then an incorrect position has been detected which can provide an output signal for further handling of the test object, for example ejection from the transport path. Various other tests and measurements, for example for diameter, size, tolerance, and the like can be carried out.

If the light source is not a point source but rather provides parallel bundled rays, collimated for example by a lens system, then it is preferred to use an additional lens system for enlarging of the light-shadow image.

Drawings, illustrating an example:

FIG. 1 is a schematic horizontal cross-sectional view through a device to test opaque workpieces with respect to orientation, size, shape, and material defects, in which standard elements such as conveyors and the like are only schematically shown;

FIG. 1a is a fragmentary view illustrating a test light source using a shutter;

FIG. 2a is a schematic side view along line II—II of FIG. 1 and showing the enlarged shadow image of a workpiece which is properly oriented, and photo-electric sensor arrangements behind the screen of the system;

FIG. 2b is a view similar to FIG. 2a, in which the workpiece is reversed;

FIG. 3 is a view similar to FIG. 2a with a workpiece having differently shaped orientation characteristics;

FIGS. 4a to 4c are schematic side views along the line II—II of FIG. 1 illustrating the test procedure to check for tolerance of length of workpieces, in which FIG. 4a shows a workpiece which is within tolerance limits; FIG. 4b a workpiece which is too long; and FIG. 4c a workpiece which is too short;

FIGS. 5 and 6 show the arrangement to test filamentary material with respect to thickness, in which FIG. 5 shows a filament with an enlarged portion in the test field, and FIG. 6 a filament with a reduced portion in the test field.

Figure 4A:
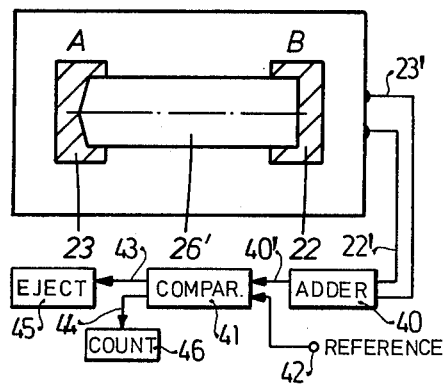

The system is, basically, shown in FIG. 1. In the example selected for FIG. 1 and FIGS. 2a, 2b, the workpieces are tiny cylindrical bolts 10, having a longitudinal dimension which is large with respect to their diameter, and which have one end 11 formed as a conical tip. Bolts 11 are to be checked for orientation, that is, the conical tip 11 should be at the right-hand side, as illustrated in FIG. 2a. A pin which passes through a transport path 24 (FIG. 1) in which the conical tip is at the left-hand side is to be rejected. The flat end portion 12, thus, should be at the left. The orientation characteristics, therefore, are the difference between the flat end portion 12 and the conical tip 11 on the pin 10.

A housing 13 (FIG. 1) has a light source 14 located therein. The light source 14 preferably is an electrically controlled flashbulb which emits flashes as the workpieces pass in a conveyor or transport test path 24 through the irradiation beam path of light from source 14. The radiation from flashlamp 14 is collimated in a lens 15 which generates a parallel beam 16. A workpiece receptacle 17 of transparent material holds the workpiece 10. Receptacle 17 is located in the conveyor path 24 of the workpieces. The beam 16, interrupted by the shadow thrown by the workpiece 10, is then enlarged in an enlarging lens 18 and projected on a screen 19. Screen 19 is transparent to light. The workpiece receptacle 17 is located on one side of the enlargement lens 18, the screen 19 is located at the enlargement side of lens 18. Lens 18 is shown only schematically and may, of course, be a composite lens system. Both the workpiece receptacle 17 as well as the screen 19 are located outside of the focal length of the lens 18, or the corresponding lens system. The lens 18 projects the real and reversed enlarged shadow image of bolt 19 on the screen 19. A bolt or pin 10 to be tested may, for example, have the following dimensions: length 25 mm; thickness 5 mm; projected, included conical angle 75°. The enlargement of lens 18 to test such a bolt or pin is, for example, about 3×.

Upon flashing of lamp 14, the lens 18 will project a shadow image of the core shadow KS on the screen corresponding to the outline of the bolt or pin 10; the area L surrounding the core shadow KS is completely illuminated, as illustrated in FIG. 1. Light beams surrounding the core shadow KS are shown at 20, 21 in FIG. 1. The projected image, as shown in FIGS. 2a and 2b, shows the core shadow 10', the conical end shadow 11' and the flat end shadow 12'. The enlarged two photo sensors 22, 23 are located behind screen 19, that is, in longitudinal direction of the image projected on the screen 19. The photo sensors 22, 23 may be arrays or groups of individual sensing elements. The sensor, or sensor array 22 is associated with the plane end 12, corresponding to the shadow image 12' of the bolt 10; the photo sensor 23 is associated with the conical end 11 and the corresponding shadow image 11' of the bolt 10. Each sensor 22, 23 has a reception surface which is schematically illustrated in FIG. 2a in cross-hatched lines to cover a portion of the core shadow KS with the respective shadow of the end portion 12', 11', as well as at least a portion of the completely illuminated surrounding area L of the screen. The coverage area of the respective photo sensors 22, 23, and shown in cross-hatched lines, is greater in the direction extending transverse to the longitudinal direction of the image of the pin 10, as projected on screen 19, than the shadow image extending in the length dimension of the pin. The coverage areas of the sensors 22, 23 is termed "test zone", since testing of the workpiece is effected by measuring and comparing the impinging light on the region corresponding to the ends of the workpiece, and hence of the coverage or window area of sensors 22, 23. The coverage areas of the two photo sensors 22, 23 preferably are identical, although they need not be. The overlap of the coverage area with respect to the shadow image and the illuminated portion i.e. the extent of the test zone into the shadow area and the illuminating area is clearly seen in FIGS. 2a, 2b by the cross-hatched portion extending beyond the shadow image 10' of the bolt or pin. Measured in the longitudinal direction of the bolt 10, the reception surface of each of the photo sensors 22, 23 is less, and as shown substantially less than the entire shadow image 10' of the bolt 10. The longitudinal extent of the reception surface of each one of the photo sensors 22, 23 is a fraction, and as shown in FIG. 2a, a small fraction of the length of the shadow image 10' of the bolt 10.

The term "photo sensor" as used herein is deemed to encompass all types of photoelectric transducer devices, such as photo cells, photo diodes, photo transistors, photo resistors, photo multiplier tubes, and the like, as well as arrays or assemblies made of individual such element. The workpiece receptacle 17 is fixed with respect to the parallel beam 16, so that the test position of the test elements, as shown in FIG. 1 with respect to pin 10, can be exactly reproduced at all times. The longitudinal axis of pin 10 extends at all times essentially transverse to the parallel beam 16 and can be transported in continuous movement along the transport or conveyor path 24, for example formed as a tube, duct, or the like, having a transport portion at least in the region of the testing area.

Lamp 14 preferably is an electronic flash tube; as shown in FIG. 1a, it is also possible to use a continuously burning lamp 14', the rays of which are projected by a lens 15' unto a lens 15", which generates parallel beams 16'. A shutter S is located at the focal point between lenses 15', 15" to provide illumination light flashes on the test object, located in the path of the beam 16' when the test object is in a test position. The shutter may be constructed like any shutter well known from the photographic field. With respect to the remainder of the apparatus, the position of lens 15" in FIG. 1a corresponds to that of lens 15 in FIG. 1.

The quantity of light sensed by the sensors 22, 23 (FIGS. 2a, 2b), respectively, in the region of the end portions of the shadow image, is schematically indicated as B and A. Since the ends 11, 12 of the bolt or pin 10 are of different shape, the shadow images 11', 12' will project on screen 19, and hence on the associated photo sensors 23, 22 different quantities of light A, B. The quantity of light A received by sensor 23 is larger than the quantity B received by sensor 22. Thus, different output signals will be derived from the photo sensors 23, 22, respectively. If these different output signals match previously set command values, then the pin 10 will be properly oriented in the conveyor path 24. If, however, the output values are inverted with respect to the command values, then the situation illustrated in FIG. 2b will result, and the pin 10 has been recognized as being improperly oriented.

If it is only desired to check orientation, then the difference in output voltage between photo sensors 22, 23 can be evaluated with respect to sign, associating for example a difference in which sensor 23 provides a larger output with a positive output; this would then indicate proper position; if, however, sensor 22 has a larger output, the comparison will yield a negative result, indicating that the bolt is positioned as in FIG. 2b, and providing a rejection or "negative" output signal.

A comparator 41 (FIG. 2a) thus can be used to compare the quantity of light received by the photo sensors, or photo sensor arrays 23, 22, and transduced into corresponding electrical output signals A, B, to thereby determine the orientation of the bolt or pin 10 in its transport path. The output signal derived from the comparator then can be connected to a suitable switching circuit which, if the orientation is sensed to be wrong, that is, in accordance with FIG. 2b, causes ejection of the respective element in the transport path, for example by mechanical interference with the receptacle unit 17. Additional output signals can be used for optical and acoustical indication, or for application to computational apparatus, for example for statistical evaluation. Ejected pins or bolts 10 can be returned to the transport path, for example after turning, to place them in properly oriented position.

FIG. 3 illustrates a bolt in which the end portion at one end thereof is of clearly different shape than that of the other. This bolt is to be used, for example, as a connecting pin for a sprocket chain with a groove to receive a C-ring or the like. FIG. 3 only illustrates the bolt or pin in its proper orientation; the sensor 22 will receive a greater quantity of light B than the sensor 23. Again, comparison of the outputs from the sensors 22, 23 will provide an output signal indicative of the orientation of the bolt in the transport path 24. The orientation recognition characteristics can be very small—for example only the difference between a rounded or conical end 11 and a flat end 12, or a circumferential groove which projects the image 25' (FIG. 3). The recognition is rapid and precise due to the optical enlargement of the shadow image projected on the screen 19. The apparatus does not have any mechanical testing or sensing element and therefore is not subject to wear and tear when scanning mechanical dimensions. No interruption in the transport movement of pins or bolts through path 24 is necessary since the flashing of the light, or shutter operation can be carried out so quickly that, for all practically purposes, the movement is "stopped".

Figure 4B:
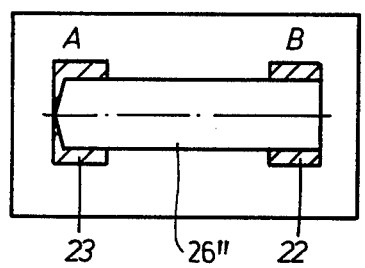
Figure 4C:
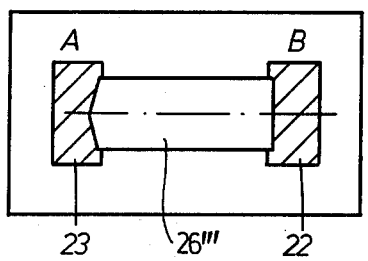

Embodiment of FIGS. 4a-4c: The system can be used to test workpieces with respect to size as well as with respect to orientation. The core shadow KS projected by a bolt as shown in FIG. 4a and shown at 26' represents a bolt of correct size. The quantity of light received by the two sensors 22, 23 is the same. The output from sensors 22, 23 is available at lines 22', 23' and applied to an adder circuit 40. The added output signal available at line 40' is compared in comparator 41 with a reference from terminal 42, representative of the added signal if the workpiece is of correct size. The output from comparator 41, available at line 43, is applied to an ejection apparatus 44, for example a flap in the transport path 24; an air jet laterally throwing out a defective bolt, or the like. The output from comparator 41 is further applied through line 44 to a counter 46. Counter 46 can be arranged to have several count sets, for example to count all the test elements which are of correct size, to count the oversized test elements and the undersized test elements. If the shadow image 26' is as shown in FIG. 4a, the comparator output 41 will not provide an ejection output over line 43 to ejector 44, but will apply a "correct" count output at line 44 to counter 46.

The system including an adder, comparator, ejector and counter can equally be applied to the system illustrated in the other figures. It is shown but once for simplicity.

The projected shadow image 26", FIG. 4b, will result in an output signal from lines 22', 23' which, when added, will an output result smaller than that of FIG. 4a. This is indicative that the test element is too large, the comparator will provide an ejection signal and a "too large" count output. The shadow image 26''' (FIG. 4c) shows that the bolt is too short. The adder 40 will provide an output signal below that of the tolerance limit of reference 42 and, again, the bolt will be ejected. In addition to the counter and injector, other control, indicating and recording units may be connected to the comparator.

Figure 5:
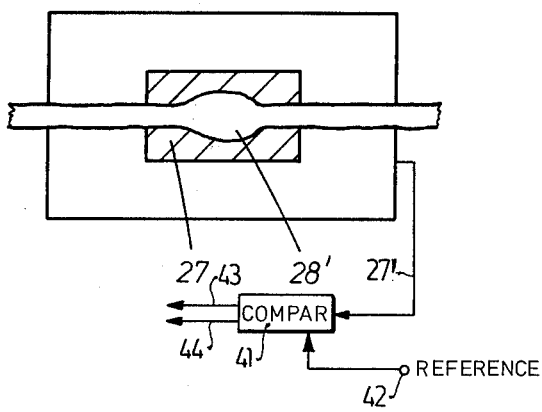

Embodiment of FIG. 5: Only a single photo sensor 27 is provided having a longitudinal measuring surface, that is, extending in the direction of the longitudinal shadow image 28' of a filamentary test object. The sensing surface is shorter than the overall longitudinal extent of the shadow image 28' of the screen, but is wider than the thickness of the shadow image and also wider than the widest dimension to be expected of the shadow image 28'. The photo sensor 27 can recognize thickened portions, as shown at 28' in FIG. 5, as well as thinner, undersized portions, as shown at 28", FIG. 6. The optical enlargement of the shadow image permits visualization of even very small changes in a standard diameter, for example small deviations which decrease the diameter thereof. The output from sensor 27, available at terminal 27', is compared in comparator 41 with reference value 42, the output again being available at lines 43, 44 indicative of proper size, undersize or oversize. The output available from terminals 43, 44 can be coordinated with a running length counter to indicate not only the length of the oversized and undersized portions, but also where they occur within the overall length of the filament being spooled.

Figure 7:
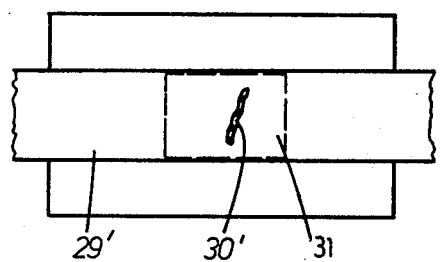
FIG. 7 is a view corresponding to that of FIG. 5 in which the test piece is formed with a transverse fissure.

The system shown in FIG. 5 can be used, additionally, to test elongated material for fissures, holes, or the like. FIG. 7 shows the shadow image 30' of an elongated test element which has light shining therethrough due to a tear in the otherwise opaque material. In the embodiment of FIG. 7, the sensing area 31 is preferably selected to be completely within the outline of the shadow 29' extending over the entire screen and thrown by the test object. Under ordinary, normal conditions, the sensor will not receive any light whatsoever. If, however, light should be measured since the test object has tears, holes, or the like, which extend entirely through the cross section of the test object, an output will be derived. The tear is schematically indicated at 30' in FIG. 7.

To test for thickened, thinned or torn portions, it is desirable that the lamp 14' be continuously operating, and the shutter S either omitted, or remaining continuously open. Alternatively, the extent of the photo cell 27, 31 (FIGS. 5 to 7) can be selected to be matched to the flashing repetition rate of lamp 14 (FIG. 1) or the shutter opening speed and repetition (FIG. 1*a*) so that the shadow image of the test object falling on the photo cell will overlap in subsequent exposures.

The test object should always have the same position in transport path 24, that is, within element 17 which defines a test zone, when testing is carried out; due to the rapid flashing capabilities of electronic flash bulbs, the position of the test object and flashing of a flash tube 14 can be readily synchronized. Position of the test object can be sensed in a position recognition unit 50, for example, by a small auxiliary light beam passing in opposite direction to beam 16 and sensing, for example, when an end portion of a bolt or pin 10 is sensed, to trigger flashing of bulb 14. Position-recognition and flashing is then practically instantaneous.

Optically enlarging the shadow image permits accurate determination of even minute positioning characteristics, or small deviations from a standard size. Using a parallel beam, as illustrated in FIG. 1, has an advantage with respect to accuracy of measurement, particularly of very small elements over use of an initially divergent beam. To generate a parallel beam, a flash light source is located within the lens system arrangement as shown in FIG. 1, or within parabolic mirrors. The system permits a simple arrangement and positioning of the photo sensors. If testing is to be carried out only with respect to orientation, or length or width of a test object, then two sensors located with respect to the shadow of the test object to recognize characteristic differences are sufficient. This would, typically, be at the end portions of the test objects. This substantially reduces costs of the photo sensors. This is apparent from a consideration of FIGS. 2*a*, 2*b*, FIGS. 3 and 4*a* to 4*c*. The lens system 18 is arranged so as to provide a real, reversed and enlarged shadow image of the test object. The enlargement may have any suitable enlargement factor. The system shown in FIG. 1, using parallel rays, provides for sharper outlines, thus sharper definition of the core shadow KS on the screen than when using originally divergent beams. Flashing the flash lamp 14 at a very short flash time additionally increases the accuracy of reproduction and hence permits sharper rejection of ambiguities from the sensors 22, 23. The output signals from the sensors can be amplified by suitable amplifiers (not shown) and additionally connected to logic circuits to control further switching functions, either before or after comparison with reference 42.

Various changes and modifications may be made, and features described in connection with any one of the embodiments may be used with any of the others, within the scope of the inventive concept.

The system and method is capable of distinguishing between minute differences in length or width. Thus, for example, a standard pin as illustrated in FIG. 4*a* may have a diameter of 5 mm and a length of 25 mm; oversize or undersize tolerances of ±0.4 mm with respect to length, or ±0.5 mm with respect to width can be determined. The groove depth of the pin of FIG. 3 need only be 0.4 mm for a pin of nominally 5 mm diameter in order to provide an output signal which can be recognized so that orientation of the pin in continuous production path 24 can be established. The flash duration of the flash tube 14 which, preferably, is a high-intensity electronic flash tube may be in the order of 1/10 second, thus being able to "stop" or "freeze" motion of test pieces trough transport system 24 at a rate of 0.6 meters/sec. while illuminating workpieces having a nominal length of 25 mm. The lumen output of such a flash tube is preferably in the order of about 800L×, the enlargement of the optical system 18 5×, and suitable photo sensors located behind a transparent screen 19 comprise 2.

Figure 6:
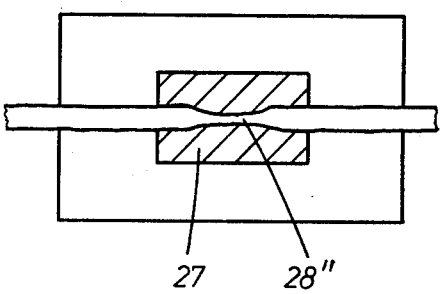

An additional advantage of the system is its versatility; by merely re-arranging the position of the sensors 22, 23 on the screen, it is possible to check for orientation, or size, or both; or, by replacing the sensors 22, 23 by a single sensor, or locating the two sensors next to each other beneath a mask and coupling the outputs together, the same system can be used to detect fissures, as illustrated in connection with FIG. 7, or thickened or undersized portions of elongated material as illustrated in connection with FIGS. 5 and 6.

I claim:

1. Apparatus to test individual elongated opaque workpieces (10) with respect to orientation, size, and the like, comprising
  a workpiece transport path (24);
  a transparent workpiece receptacle (17) positioned within said transport path;
  a single pulsed light source (14, 14') generating a pulse of a beam of light (16) larger than said workpiece and irradiating said receptacle and a workpiece (10) therein which, when in the path of the beam (16) of light will partially block the path of the beam and thereby generate a core shadow (KS) of the workpiece;

means (50) sensing presence of a workpiece in said receptacle and controlling said pulsed light source to provide said pulse of light;

projecting means (18) and an impingement plane (19) projecting the pulse of the beam of light and the shadow of the workpiece on said plane (19);

two electro-optical transducer means (22, 23) located adjacent the end portion of the plane (19) transversely with respect to the longitudinal extent of the shadow image (10', 25', 26', 26", 26''') projected by the workpiece on said plane, the coverage area of each of said transducer means forming a test zone overlapping a portion of the illuminated screen adjacent the end of the shadow image, said transducer means measuring the relative intensity of received light (L) in relation to the core shadow (KS) on said plane at the end portions of said plane and providing electrical output signals representative of said measured amount of light;

and electrical comparator means (40, 41, 42, 45, 46) connected to both said transducer means and comparing the output thereof and providing an output test signal representative of said comparison.

2. Apparatus according to claim 1, wherein the projection means comprises an enlargement lens (18) projecting a real, enlarged shadow image (10'-12') of the workpiece (10) of said plane (19).

3. Apparatus according to claim 2, wherein the enlargement lens (18) is located between the workpiece placing means (17, 24) and said plane (19), the workpiece placement means and said plane being located beyond the focal length of the enlargement means (18).

4. Apparatus according to claim 1, wherein the light source (14) comprises an electronic flash tube.

5. Apparatus according to claim 1, wherein the light source comprises means (14') generating light and a shutter (S) between the light source and said workpiece placement means (17, 24).

6. Apparatus according to claim 1, wherein the coverage area of each of said transducer means is wider than the shadow image (10', 25', 26', 26", 26''') of the workpiece, and the outer limits of the coverage areas, in the longitudinal direction of the workpiece, overlaps and is longer than the maximum expected dimension of the workpiece.

7. Apparatus according to claim 1, wherein the coverage area of each of said transducer means (22, 23) is wider than the shadow image (10') of the workpiece, and the outer limits of the coverage areas of said photo sensors are matched to the length of the workpiece, whereby minute differences in shape of the end portions of the workpieces can be evaluated.

8. Apparatus according to claim 1, wherein the comparator means (41) provides an output representative of which one of the transducer means has received the greater quantum of light.

9. Apparatus according to claim 1, wherein said plane is formed as a screen (19) which is light-transmissive; and said transducer means comprise photo electric sensors (22, 23) located behind said screen.

10. Apparatus according to claim 1, wherein said transducer means comprises two arrays or panels of photosensitive transducer elements (22, 23), one each located adjacent the end portions of the core shadow (KS; 10', 25', 26') of a workpiece in receptacle (17) and each covering a test zone of equal size.

11. Apparatus according to claim 1, wherein the light source comprises a high-intensity electrical flash tube, and said projection means includes an enlargement optic system projecting an enlarged shadow image of the workpiece in said placement means on said screen.

12. Method to rapidly test continuously moving opaque, elongated workpieces with respect to orientation, size, and the like, comprising sensing presence of a workpiece in a test zone;

generating a pulse of beamed light (16) larger than said workpiece when said presence of a workpiece is sensed;

locating the workpiece in the path of the pulsed beam of light in predetermined position with respect thereto, to partially block the beam of light and generate an elongated shadow image (KS) of the workpiece;

projecting the beam of light, and the elongated shadow image on a plane (19);

establishing test zones adjacent the ends of the elongated shadow image, each test zone extending partly into the shadow image of objects to be tested and partly into a predetermined region of the beam of light;

measuring the light intensity projected on the screen at each test zone by measuring the portion of light of the light pulse passing around the test object at the respective test zones and deriving respective outpt signals corresponding to the light in excess of the core shadow of the test object at each test zone;

and evaluating the output signals derived from the respective test zones including the step of comparing said output signals with each other.

13. Method according to claim 12, further comprising the step of optically enlarging the projected beam and shadow image before light intensity is measured.

14. Method according to claim 12, wherein the step of evaluating the output signals derived from the respective test zones comprises deriving an output indicating which one of the test zones has received greater amount of light.

* * * * *